Sept. 8, 1964 E. W. DILG Re. 25,638

MIXER

Original Filed Oct. 28, 1959 4 Sheets-Sheet 1

INVENTOR.
EARL WILLIAM DILG

BY Milton E. Gilbert

ATTORNEY

MIXER

Original Filed Oct. 28, 1959 4 Sheets-Sheet 2

INVENTOR.
EARL WILLIAM DILG
BY Milton E. Gilbert
ATTORNEY

MIXER

Original Filed Oct. 28, 1959 4 Sheets-Sheet 3

INVENTOR:
EARL WILLIAM DILG
BY
Milton E. Gilbert
ATTORNEY

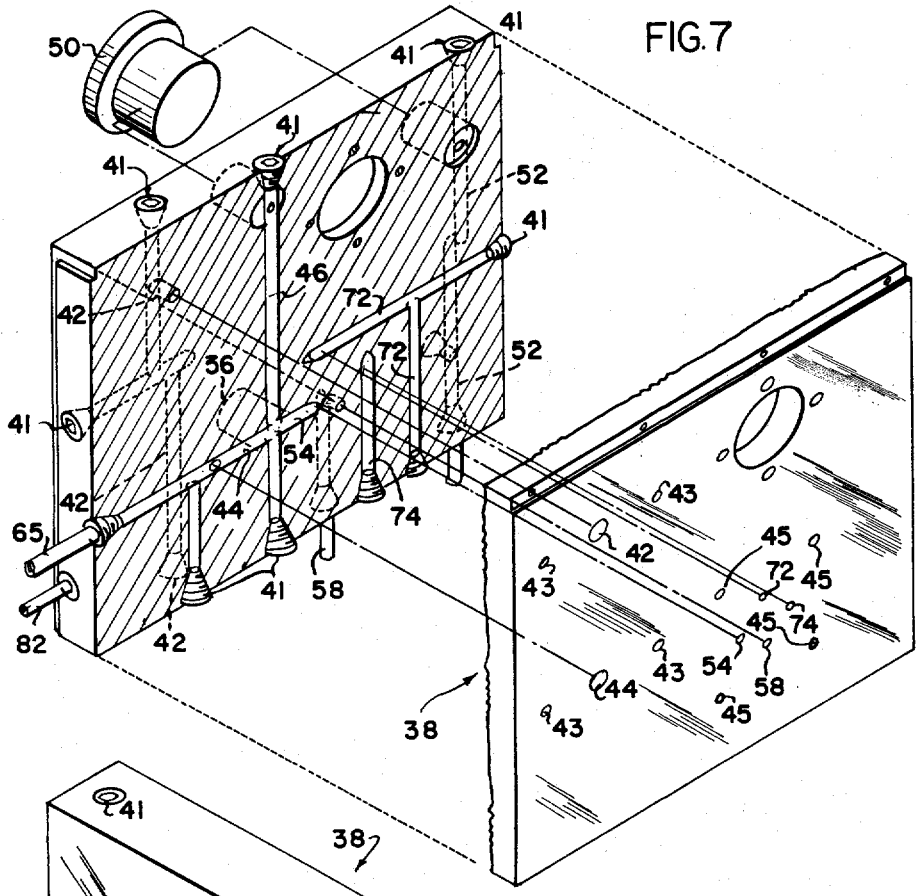
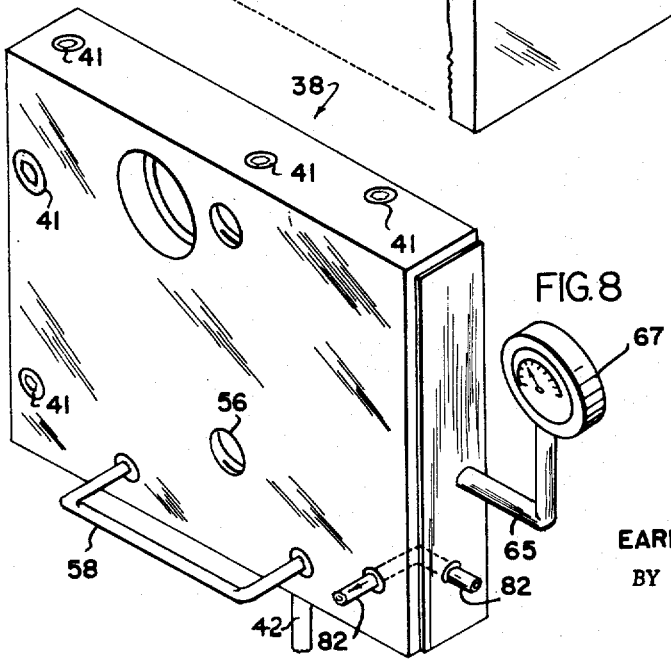
INVENTOR.
EARL WILLIAM DILG
BY William E. Gilbert
ATTORNEY

United States Patent Office

Re. 25,638
Reissued Sept. 8, 1964

25,638
MIXER

Earl William Dilg, Dayton, Ohio, assignor to
Max Isaacson, Dayton, Ohio

Original No. 3,023,580, dated Mar. 6, 1962, Ser. No. 849,338, Oct. 28, 1959. Application for reissue Mar. 21, 1963, Ser. No. 267,896
6 Claims. (Cl. 60—52)

Matter enclosed in heavy brackets [ ] appears in the original patent but forms no part of this reissue specification; matter printed in italics indicates the additions made by reissue.

This invention relates to a mixer, and is more particularly concerned with a mixer operated by hydraulic motors.

An object of the invention is to provide a mixer for mixing various types of fluids and semi-fluids, which is a simple construction, readily operable, and easily adjustable. Another object of the invention is to provide in a hydraulically operated mixer, an improved hydraulic system.

*A further object of the invention is to provide, in a mixer, an expansible conduit means in communication with a hydraulic motor generating torques thereabout; with the conduit being provided with means to prevent relative rotation of its parts.*

*A still further object of the invention is to provide a completely enclosed hydraulic system for a hydraulically operated mixer, wherein all leakages flow back to a reservoir.*

*Another object of the invention is to provide an internal expansible conduit for a hydraulically operating mixer which may be devoid of hose connections, in which the expansible members are in intimate engagement throughout their length.*

These and other advantages will become more readily apparent, upon a reading of the description following hereinafter and upon an examination of the drawings, in which:

FIGURE 7 is an expanded perspective view of the control panel manifold of the invention, FIGURE 8 is a perspective view of the control panel manifold of the invention when assembled.

Figure 1:
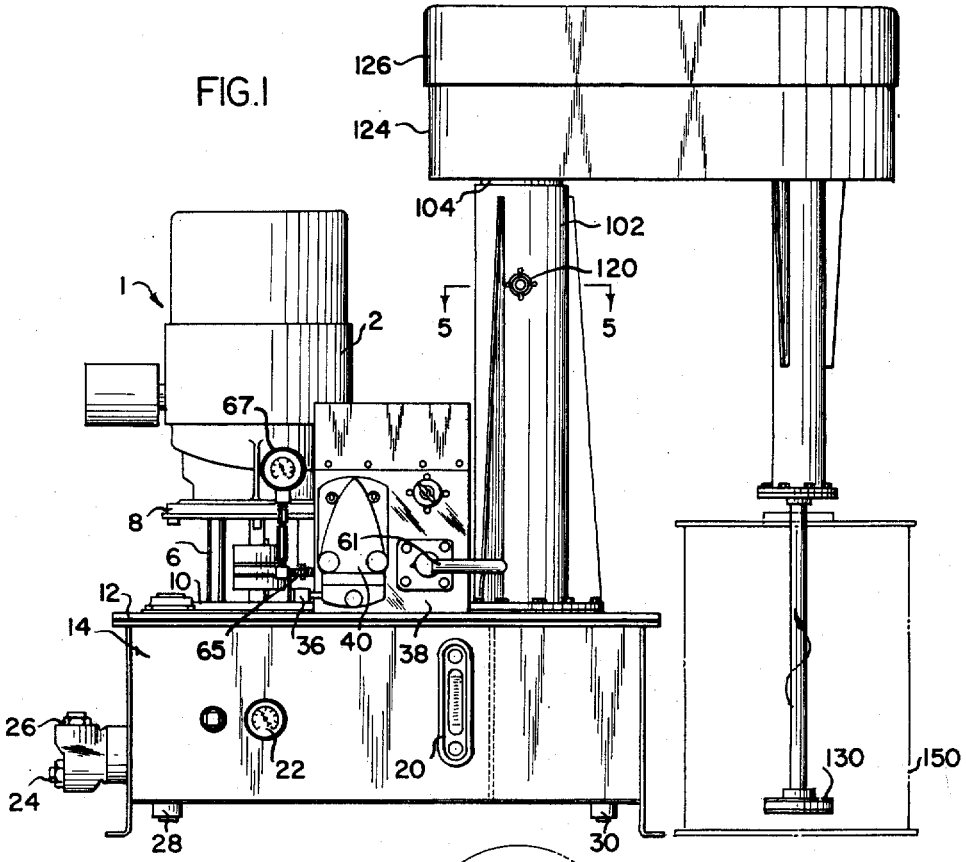
FIGURE 1 is a side view of the hydraulically operated mixer of the invention.
Figure 6:
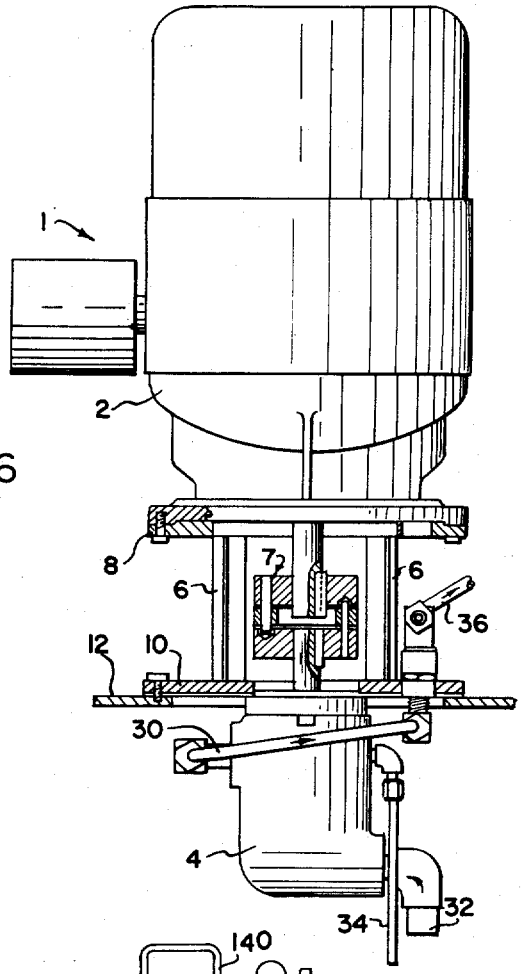
FIGURE 6 is a side view, partially a cross-section, of the pump and motor mounting.

As shown in FIGURE 1 and more clearly shown in FIGURE 6, the mixer of the invention comprises a motive power source 1 which consists of an electric motor 2 drivingly mounted to operate a hydraulic pump 4. The electric motor 2 is mounted upon a mounting bracket comprising standards 6, 6 and flanges 8 and 10. The flange 8 is bolted to the motor 2 and the flange 10 is bolted to the cover 12 of the tank 14. The motor 2 drives the pump 4 through a locked coupling 7.

The tank 14 is compartmented by means of baffle plates into an oil compartment 16 and a coolant (preferably water) compartment 18. Alternatively the coolant can be circulated through coils immersed in the oil tank 14. The oil level is indicated by gauge 20 and the oil temperature is indicated by gauge 22. The coolant means is admitted through inlet conduit 24 and withdrawn out of tank 14 via outlet 26. Appropriate drains 28 and 30 are located on the underneath of the tank 14 to drain the compartments 16 and 18, respectively.

Pump 4 operates to draw oil via conduit 32 from the oil sump 16 through pump 4 and through conduit 36 to the manifold, described hereinafter. A drain 34 is provided from the pump 4 leading to the sump and drain plug 28.

Figure 9:
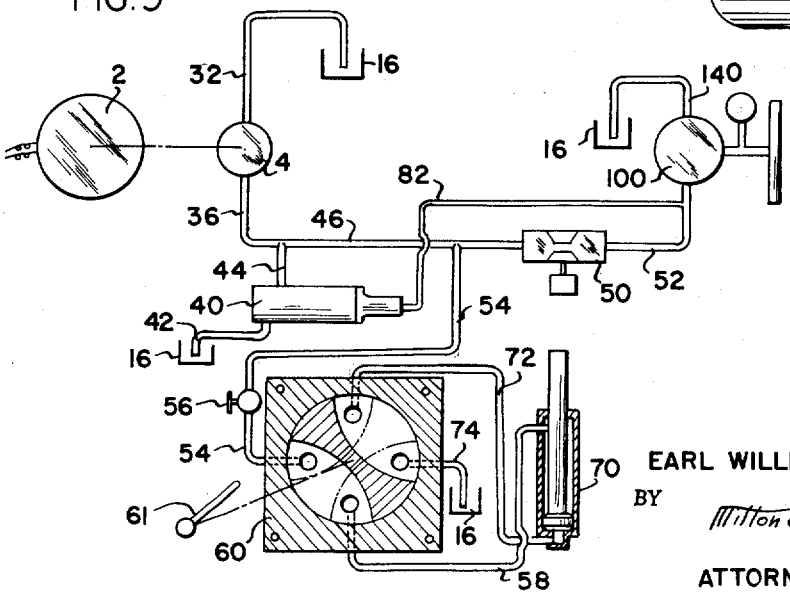
FIGURE 9 is a schematic view of the hydraulic system of the invention.

Reference is now made to FIGURES 7 and 8. The control panel 38 which is mounted upon the tank 14 is provided with a series of drilled passages having a series of plugs 41 closing off the ends of selected bores as as to provide conduits as hereinafter described. Referring also to FIGURE 9, it is seen that the motor 2 drives pump 4 to withdraw oil from sump 16 via conduit 32. The pump 4 transmits oil through conduit 36 to the distributing manifold 38. The various conduits shown in FIGURE 9 are formed by drilled passages in the manifold as shown in FIGURES 7 and 8. The outlet 36 from pump 4 to the manifold 38 is distributed via conduit 44 to a pressure relief valve 40. The front of the manifold 38 is indicated in FIGURE 7 as being provided with a series of mounting holes 43 to permit the mounting thereto of the pressure relief or regulating valve 40. A satisfactory valve for this purpose would, for example, be one manufactured by the Dennison Manufacturing Co., and designated as relief valve model 063133A. This valve controls the pressure of the oil transmitted to the hydraulic motor 100, described hereinafter. A drain conduit 42 leading from the pressure relief valve 40 extends down to the sump 16. A gauge 67 may be inserted within the conduit 65 communicating with conduit 44 to measure the inlet pressure of the pressure relief valve.

The outlet conduit 36 from the pump 4 also supplies fluid through conduit 54 to a 4-way valve 60 which controls the flow of fluid to the *lifting means or* lift cylinder 70, *described hereinafter*. Fluid also flows through conduit 46 to a flow control valve 50 which regulates the speed of hydraulic motor 100 by transmitting fluid through conduit 52. The output of the pressure regulator valve 40 is fed through conduit 82 through the manifold 38 to hydraulic motor 100.

The 4-way control valve 60 is provided with four conduits 54, 58, 72 and 74. When the position shown in FIGURE 9, flow from pump 4 is transmitted via conduits 36, 46, 54, past the flow restriction valve or metering orifice 56 and through connecting conduit 58 to the upper part of the lift cylinder 70. The *piston within the* cylinder will then be caused to lower and thereby force the fluid entrapped below the piston within that cylinder out the bottom of the cylinder and through conduit 72 to the flow control valve 60. Conduit 72 in the position of the valve 60 shown in FIGURE 9, is interconnectd with conduit 74 so that the fluid flowing out of the lift cylinder is transmitted via conduit 74 back to the sump 16. As shown by the dotted lines in FIGURE 9, when it is desired to lift the *piston of* cylinder 70 the valve is positioned into the position shown by the dotted lines so that conduits 54 and 72 are interconnected to transmit fluid from pump 4 to the lower part of the cylinder 70 and thereby raise the piston to force fluid out of the upper part of cylinder 70 through conduit 58, and to the then interconnecting conduit 74 to the sump 16. Thus, by simple manipulation of the handle 61 the flow control valve 60 can be positioned either to transmit fluid from pump 4 to raise or lower *the piston within* lift cylinder 70. Alternatively, a motor actuated automatic control can be substituted for the manually operable handle 61. As indicated in FIGURE 7, the 4-way valve 60 is mounted on the front of manifold 38 by a series of mounting holes 45.

*As indicated above, the hydraulic mixer of the invention*

*includes an expansible conduit means. This means comprises three telescopic pairs of members carried by the tank 14. The outermost pair 102, 104 serve as a guide means while permitting relative rotation; the central pair of members 108, 110 comprise a lifting means or lift cylinder for the innermost pair 109, 110 which function as a collapsible conduit. The piston 110 serves as a common member for the central and innermost telescopic pairs of members, i.e., the left cylinder and expansible or extendible conduit means.*

Figure 3:
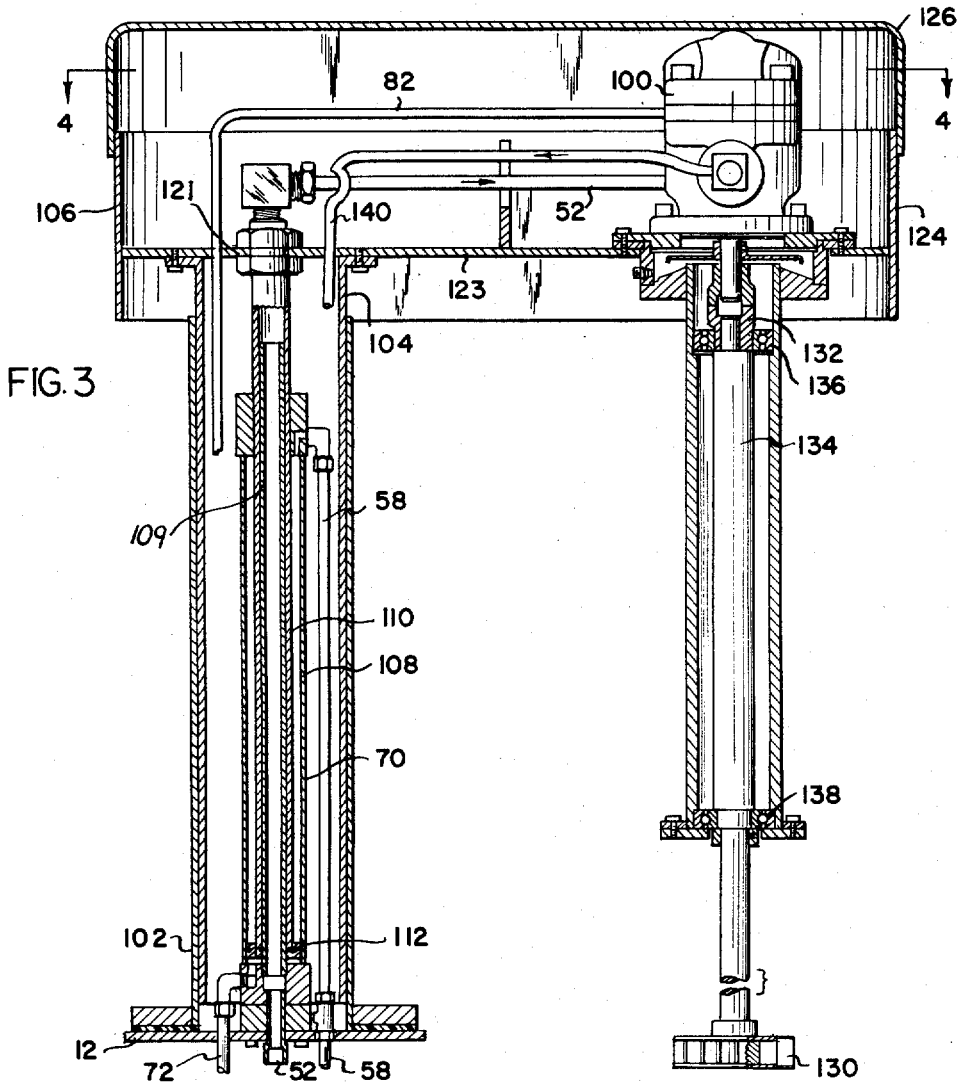
FIGURE 3 is a cross-sectional view taken along line 3—3 of FIGURE 2.
Figure 4:
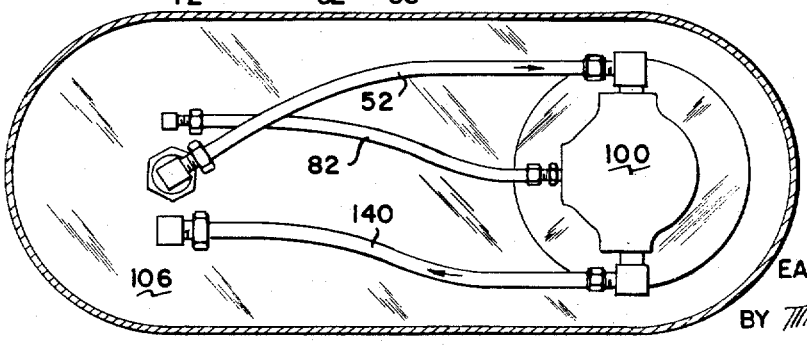
FIGURE 4 is a cross-sectional view taken along line 4—4 of FIGURE 3.

The *lifting means or* lift cylinder 70 is more clearly shown in FIGURE 3. Mounted upon the cover plate 12 of the tank 14 is an external column 102. This column 102 is fixedly mounted to the tank cover and its inner surface serves as a bearing surface for an internal column 104 which is mounted fixedly at its upper end to a top housing 106. The mating surfaces of the columns 102 and 104 are preferably polished to provide for easy sliding. *In operating position the columns 102, 104 are locked together by a pin-slot means as described hereinafter, or alternatively the members 102, 104 can be so formed (e. g., threaded or other configuration) as to accomplish the purpose of guiding the top housing 106, while permitting relative rotation of members 102, 104 to enable positioning of top housing 106.* Mounted within the *guide means or* telescopic cylinders 102, 104 is the lift cylinder 70 which consists of an outer cylinder 108 fixedly mounted upon the lid 12 of tank 14, within which slides an inner piston 110 appropriately fitted with a plunger 112. The piston is hollow and in turn slides upon a guide tube 109 which forms the conduit 52 leading to the hydraulic motor 100. The tube 109 and piston 110 are also preferably polished on their mating surfaces.

Figure 2:
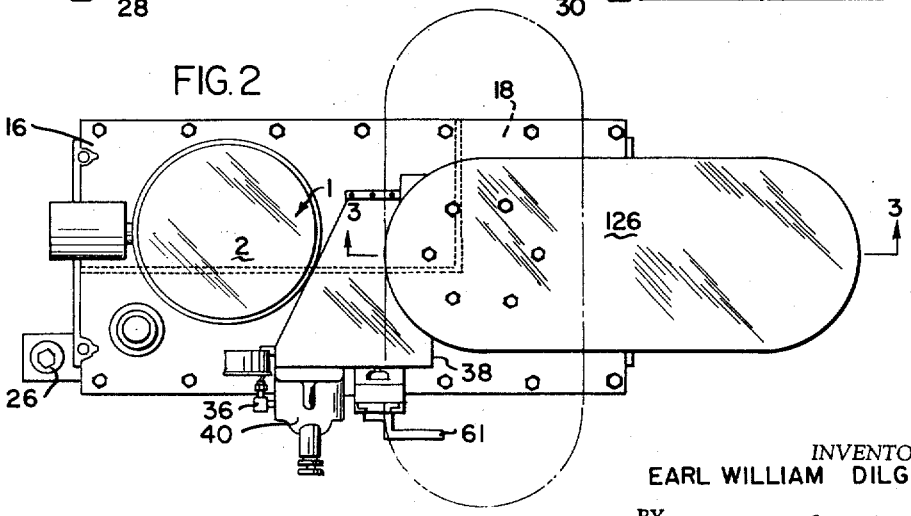
FIGURE 2 is a top view of the mixer of FIGURE 1.
Figure 5:
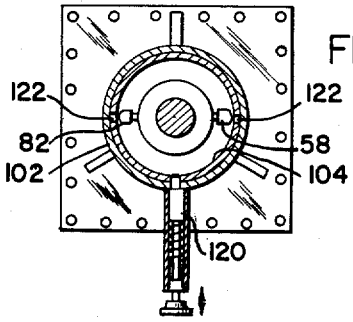
FIGURE 5 is a cross-sectional view taken along line 5—5 of FIGURE 1.

As indicated above, the tubular member 110 is appropriately affixed by a fastening means 121 to a top housing 106. This top housing may be positioned in either of three positions, two of which are shown in phantom form in FIGURE 2 (*obviously infinite positioning may also be accomplished*). The positioning of this top housing 106 *may be* [is] accomplished as shown *for example* in FIGURES 1 and 5, by means of a spring loaded detent 120 which engages in a series of holes 122 in the internal cylinder column 104. The operation of such device is believed readily apparent from an examination of these figures.

The top housing comprises a lower shroud 124 and a top cover 126 which are arranged for ready disengagement when it is desired to service the motor 100. The shroud 124 is provided with a shelf 123 to which the internal column 104 is affixed and also to which the plunger 110 is affixed. Mounted at one end of the shelf 123 is the hydraulic motor 100. This motor serves to rotate a shrouded turbine 130 to perform the mixing.

Fluid to drive the hydraulic motor 100 flows in from conduit 52 and out through conduit 140 to the sump 16. The motor 100, through an appropriate coupling 132, drives the drive shaft 134 which is journalled at 136 and 138. Coupling 132 preferably runs in an oil bath as shown.

In operating the mixer, when the pump 4 is actuated by *electric* motor 2, *the by-pass line 44 relieves pressure on the motor during start-up, thereafter* fluid is transmitted through conduit 36 to the manifold 38 and by manipulation of the 4-way control valve 60 the *lifting means or* lift cylinder 70 can be raised or lowered to position the shrouded turbine 130 into any desired position in the tank 150 to commence mixing of the material to be mixed. The position of the shrouded turbine 130 is thus adjusted to that desired and the hydraulic motor 100 is actuated at a speed controlled by the setting of the motor speed control valve 50.

As thus described, by the use of a simple *completely enclosed* hydraulic system, a high speed mixer, is obtained which is particularly adapted for mixing white ware, glaze, and porcelain enamel. The hydraulic motor drive has infinite speed range, from zero to its maximum, and eliminates bolting or gearing. By the control manifold panel of the invention, only two operating controls are necessary; one for turbine shaft speed and one for up, down or neutral position. *By the novel 3-pair telescopic means of the invention, sliding extendible means are provided to serve as a guide and positioning mechanism for the top housing; to serve as a lifting means for said top housing, and also to serve as a collapsible conduit for conducting fluid to operate the hydraulic motor drive for the mixing element.* While only a specific modification of the mixer of the invention has been described, it will become readily apparent to those skilled in the art that various modifications may be made without departing from the scope and spirit of the invention.

What I claim is:

1. A mixer, comprising in combination: a motive power source including a motor and pump, a fluid reservoir, a unitary flow control manifold, a first fluid motor means for rotating an element, a second fluid motor means for raising and lowering said element, a first and a second valve means arranged to monitor flow to said first and second motor means respectively, said manifold comprising a plate member having a series of bores therein a plurality of which are interconnecting, conduit means including said manifold bores interconnecting said pump to said reservoir and interconnecting said first and second fluid motor means in parallel fluid circuit, said second fluid motor means comprising *one pair* of three concentrically arranged telescopic pairs of tubular members, one tubular member being common to two of said pairs of tubular members, said one tubular member being formed as a piston and arranged to be raised and lowered by said hydraulic fluid, said one tubular member being further mounted to integrally raise and lower said first fluid motor and element, said second valve means being positionable into a first operative position to interconnect selected bores for transmitting fluid to said second fluid motor so as to raise said element, and into a second operative position to interconnect the said selected bores in a different communicative combination for transmitting fluid to said second fluid motor so as to lower said element, a flow restricting orifice means interposed between said pump and said second valve means and a pressure relief valve means interposed in said conduit means between the first motor means and the outflow of said first valve means to control the fluid pressure transmitted to said first motor means.

2. The mixer of claim 1 wherein said conduit means comprises a main conduit leading from said pump to said first motor means and first and second branch conduits leading from said main conduit prior to said motor means, said pressure relief valve means being located in said first branch conduit, said second valve means and flow restricting means being located in said second branch conduit and the innermost telescopic pair of tubular members consisting of said piston member and an inner tubular member forming a portion of said conduit for conducting fluid from said pump to said first fluid motor means.

*3. A mixer device, comprising in combination: a motive power source including an electric motor in driving connection to a fluid pump, a fluid reservoir for said pump, a housing, fluid pressure powered means mounted upon and in fluid communication with said reservoir for raising and lowering said housing, a fluid pressure motor means carried by said housing for rotating an element offset from said fluid pressure powered means, valve means and conduit means arranged to monitor and control fluid flow to and from said fluid pressure powered means and fluid motor means, extendible conduit means including a portion of said fluid pressure powered means and in circuit with said reservoir and pump to provide fluid pressure for both the fluid pressure powered means*

*for raising and lowering said housing and for said fluid pressure motor means so as to form a single fluid system for said device, and guiding means for said conduit means.*

*4. The mixer device of claim 3 wherein said guiding means, conduit means and said fluid pressure powered means for raising and lowering said housing is comprised of three concentrically arranged telescopic pairs of tubular members, one tubular member being common to two of said pairs of tubular members, said one tubular member being formed as a piston and arranged to be raised and lowered by said fluid flow, said one tubular member being further mounted to integrally raise and lower said housing and the innermost tubular member cooperating with said one tubular member to form a portion of said extendible conduit means, whereby rotational movement between said respective tubular members of each pair is permitted, while maintaining sealing conditions against efflux of fluid.*

*5. The mixer device of claim 3 wherein said guiding means, conduit means and said fluid pressure powered means for raising and lowering said housing is comprised of two discrete pairs of telescopic elements arranged around a central standpipe affixed to either of said housing or reservoir, one pair of telescopic elements consisting of telescopic piston and cylinder members mounted around said standpipe with one of said members being in intimate contact with said standpipe substantially throughout its length, and the second pair of telescopic elements being affixed one to said housing and one to said reservoir, whereby the guiding of vertical and rotational movement of said housing is accomplished.*

*6. A mixer device, comprising in combination: a motive power source including an electric motor in driving connection to a fluid pump, a fluid reservoir for said pump, a housing, fluid pressure powered means mounted upon and in fluid communication with said reservoir for raising and lowering said housing, a fluid pressure motor means carried by said housing for rotating an element offset from said fluid pressure powered means, valve means and conduit means arranged to monitor and control fluid flow to and from said fluid pressure powered means and fluid motor means, extendible conduit means including a portion of said fluid pressure powered means connecting the output of said pump to said fluid motor and in circuit with said reservoir and pump to provide fluid pressure for both the fluid pressure powered means for raising and lowering said housing and for said fluid pressure motor means so as to form a single fluid system for said device, said fluid pressure powered means and said extendible conduit means comprising a central standpipe affixed to either of said housing or reservoir, telescopic piston and cylinder members mounted around said standpipe with one of said members being in intimate contact with said standpipe substantially throughout its length.*

References Cited in the file of this patent or the original patent

UNITED STATES PATENTS

| | | |
|---|---|---|
| 1,294,266 | Hogg | Feb. 11, 1919 |
| 1,320,845 | Dayton et al. | Nov. 4, 1919 |
| 1,911,132 | Macomber | May 23, 1933 |
| 2,042,186 | Peterson | May 26, 1936 |
| 2,292,278 | Lorenz | Aug. 4, 1942 |
| 2,481,731 | Dubin | Sept. 13, 1949 |
| 2,511,184 | Walling | June 13, 1950 |
| 2,568,528 | Welte | Sept. 18, 1951 |
| 2,635,586 | Kuhn | Apr. 21, 1953 |
| 2,665,122 | Rowland | Jan. 5, 1954 |
| 2,706,623 | Styes | Apr. 19, 1955 |
| 2,860,487 | Wheeler | Nov. 18, 1958 |
| 2,881,589 | Hitt et al. | Apr. 14, 1959 |
| 2,896,677 | Payzant | July 28, 1959 |